Nov. 10, 1964 J. B. COULTER, JR Re. 25,684

METHOD OF MAKING ROCK BIT CUTTER

Original Filed July 5, 1956 2 Sheets-Sheet 1

INVENTOR
JOHN B. COULTER JR.
BY
Raymond G. Mullee
ATTORNEY

Nov. 10, 1964 J. B. COULTER, JR Re. 25,684

METHOD OF MAKING ROCK BIT CUTTER

Original Filed July 5, 1956 2 Sheets-Sheet 2

INVENTOR
JOHN B. COULTER JR.
BY
Raymond S. Mullee
ATTORNEY

United States Patent Office

Re. 25,684
Reissued Nov. 10, 1964

25,684

METHOD OF MAKING ROCK BIT CUTTER

John B. Coulter, Jr., Fort Worth, Tex., assignor to Chicago Pneumatic Tool Company, New York, N.Y., a corporation of New Jersey Original No. 3,003,370, dated Oct. 10, 1961, Ser. No. 3,314, Jan. 19, 1960, which is a division of Ser. No. 595,982, July 5, 1956, now Patent No. 2,927,778, dated Mar. 8, 1960. Application for reissue Sept. 11, 1963, Ser. No. 308,295

7 Claims. (Cl. 76—108)

Matter enclosed in heavy brackets [ ] appears in the original patent but forms no part of this reissue specification; matter printed in italics indicates the additions made by reissue.

This invention relates to a method of manufacturing rock bit cutters of the type which operate on the earth formation with a rolling action. This application is *for reissue of U.S. Patent No. 3,003,370. That patent was granted on October 10, 1961, as* a division of parent application Serial No. 595,982, filed July 5, 1956, which is now Patent No. 2,927,778, dated March 8, 1960.

The usual rock bit comprises three conical cutters each having widely spaced circumferential rows of teeth offset in relation to the corresponding rows on the other cutter to drill the formation at the bottom of the hole, the particles of detritus thus dislodged being removed by the action of a liquid flushing fluid or of pressurized air or gas. Cone bits in common use fall into two general classes, those having sharp chisel teeth and those in which the teeth are made of hardened inserts or plugs with an ovoid portion projecting beyond the cone surface. The chisel tooth operates with a chipping or slicing action and will drill in all but the very hardest formations. It is characterized by a sharp cutting edge or crest which extends radially of the cone from one circumferential groove to the next, the flanks of the teeth being separated from adjacent teeth in the same circumferential row by means of deep radial grooves, which act to receive the loosened earth formation and permit deep penetration of the teeth. In extremely hard and abrasive formations such as quartzite, granite and flint, the chisel toothed cone will not drill effectively and is replaced by the inserted plug type of cutter which is so designed that the blunt areas of the tungsten carbide plugs engage the formation with a crushing action and thus fracture the formation rather than chisel it.

The inserted plug type of cutter has the disadvantage in that the cost is about five times that of a chisel toothed cutter. A further disadvantage of the inserted plug type is that it loses much of its effectiveness when it reaches the end of a layer of extremely hard formation, for which it was designed, and encounters a softer formation. This is due to the fact that the projecting portions of the tungsten carbide plugs are necessarily very short and do not have the penetrating action required for softer formations. Still another disadvantage is that the plugs sometimes are dislodged from their sockets.

An object of this invention is to manufacture a cone cutter of the crushing type at a fraction of the cost of the inserted plug cutter now used for the same purpose.

Another object is to obviate the danger of the cutter teeth becoming dislodged from the cutter body. This object is attained by a novel method of forming the teeth which provides an ovoid shape for operation with a crushing action but which does not require that the teeth be fabricated separately from the cutter body to produce the desired shape.

A further object is to case harden the cutter to a greater depth than usually attained under conventional methods, but without the accompanying danger of chipping off the tooth crests.

A further object of this invention is to manufacture a tooth integrally with the cutter body, and to provide the tooth with a rounded or cylindrical crest, which is capable of drilling with a crushing action, as well as with a root portion lying below the crest to provide deep penetration.

The manufacture of the rock bit cutter starts with the step of turning a steel cone blank about its axis while feeding a plurality of forming tools toward the blank to cut circumferential grooves therein separated by ridges having straight sides. The present invention includes the additional steps of feeding a second set of forming tools at a different angle toward the grooved work piece while turning the latter to round off one side of each of a plurality of ridges; feeding a third set of forming tools at a still different angle toward the grooved workpiece to round off the other side of each of a plurality of ridges until the upper portion of each ridge is shaped into a half torus; then cutting radial groves transverse to the ridges to divide them into circumferential rows of individual teeth; then rounding the flanks of the teeth adjacent the radial grooves to form an undulating surface extending circumferentially of the row of teeth.

The undulating surface produced by the machining process above described is devoid of sharp corners. In accordance with the invention, advantage is taken of this fact to case harden the cutter to a greater depth and to a greater degree of hardness than would be feasible in a cutter made by conventional methods, because the usual sharp corners would chip or break. The increase in case hardening prolongs the life of the cutters.

Figure 1:
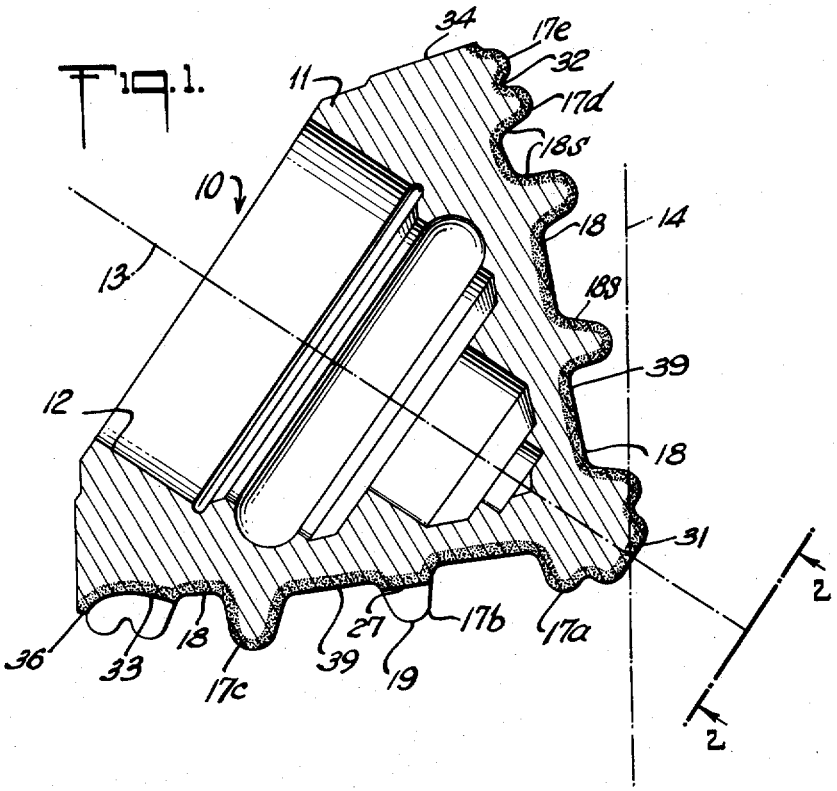
FIG. 1 is a longitudinal section of a rock bit cutter manufactured by the process of this invention.

Referring to FIG. 1, the completed cutter 10, which is manufactured by the process of this invention, comprises a body portion 11 provided with the usual bore 12 which is shaped for cooperation with a spindle (not shown). The cutter is arranged, in a well known manner, for rotation about its individual axis 13 and for revolution about the axis 14 of the hole being drilled. The surface of the cutter, which rolls along the bottom of the hole, is generally of conical shape. It comprises a series of circumferentially extending rows of teeth 17a, 17b, 17c and 17d of novel formation, separated by wide and deep circumferential grooves 18; also a row of similar teeth 17e in radial alinement with teeth 17d. Each circumferential groove has a conical bottom 18b and two straight sides 18s diverging from the bottom. Connecting the straight sides 18s of two adjacent grooves is a rounded surface 19 which forms the crest portion of the teeth 17b and 17c.

Figure 3:
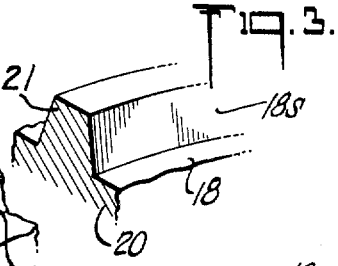
FIG. 3 is a fragmentary view in perspective of a circumferential ridge on the cutter of FIG. 1 when in a preliminary state of manufacture.
Figure 6:
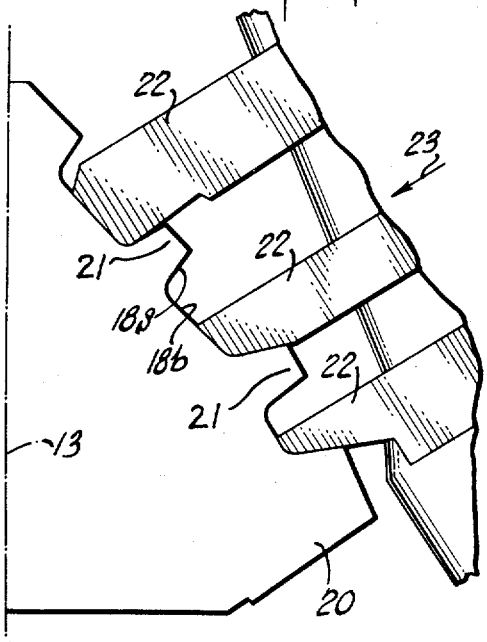
FIG. 6 is a half-longitudinal section of a cutter like the one shown in FIG. 1 but in the process of manufacture (as in FIG. 3), showing also the tools for forming the straight sides of the ridges between circumferential grooves as the cutter is being turned on its axis.
Figure 7:
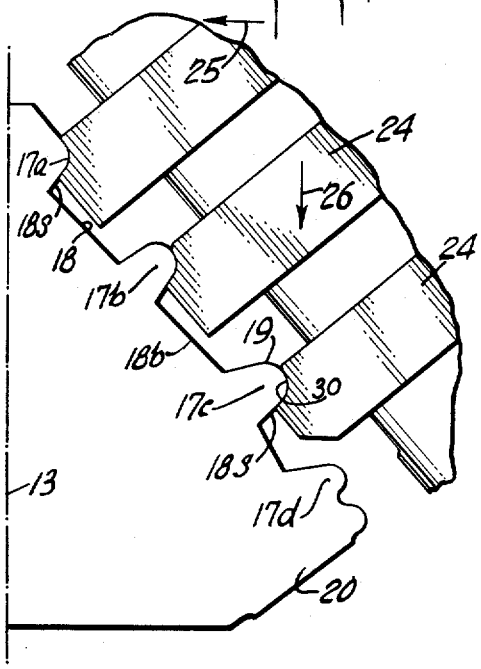
FIG. 7 is a view similar to FIG. 6 showing the tools forming the rounded or cylindrical portions of the circumferential ridges.

Referring to FIG. 6, the circumferential grooves 18 are formed by starting out with a smooth forging or cutter blank 20, turning it about its axis 13 while moving a set of forming tools 22 in the direction of the arrow 23. This operation is repeated, with cutting tools of different shape, until the bottoms 18b and straight sides 18s of the grooves 18 are formed, leaving therebetween ridges *21* with straight sides as shown in FIGS. 3 and 6. Referring to FIG. 7, the top portions of the sides 18s are then rounded away by moving a different set of forming tools 24 each having a cutting edge *30* in the shape of a *curve which includes* a circular arc of about 90°. In this operation, the cutter is again turned about its axis while the tools 24 with the curved cutting edges *30* are fed in a generally horizontal direction as indicated by the arrow 25 in FIG. 7, thus rounding off the front sides of the teeth 17a, 17b and 17c. In a like manner, a set of forming tools (not shown) is fed in a generally vertical direction as indicated by the arrow 26 in FIG. 7 to round off the back sides of the teeth 17b, 17c and 17d. Other edges of teeth 17a, 17d and 17e may be rounded off in a similar manner by feeding toward the rotating cutter or tool or set of tools of the desired configuration.

Figure 4:
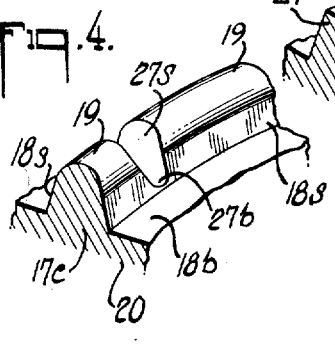
FIG. 4 is a view similar to FIG. 3 in a later stage of operation in which the circumferential ridge has its corners rounded off and has a radial groove partly formed therein.

Following the cutting of the circumferential grooves 18, as indicated in FIGS. 6 and 7, the row of teeth, for example, row 17c has the shape of a half torus superposed upon a trapezoid of revolution as shown in FIG. 4. That is to say, the tooth in section comprises a root portion bounded between the tapering straight sides 18s and a tip or crest portion forming a half circle 19 connecting the sides. Referring to FIGS. 4 and 7, the root portion which lies below the center of the arc 19 has a substantial depth, being approximately equal to or even greater than the crest portion. This is an important feature of the invention as will be explained later.

Figure 2:
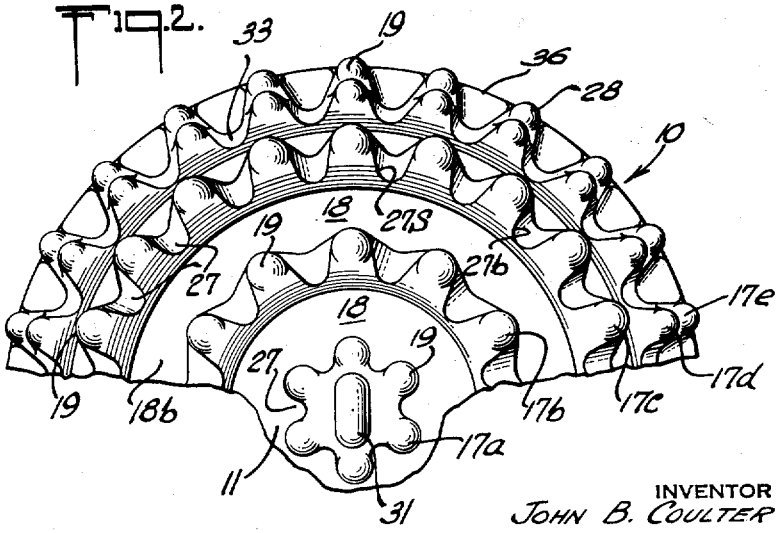
FIG. 2 is an end view of the illustrative cutter with the lower part broken away, looking along the axis of the cutter as indicated by the arrows 2 in FIG. 1.
Figure 5:
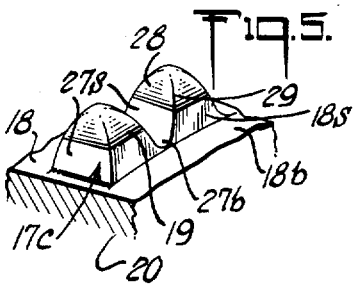
FIG. 5 is a fragmentary view in perspective of two adjacent teeth at a still later stage of manufacture.

The continuous circumferential ridges *21* which lie between and adjacent to the circumferential grooves 18 are then broken up into rows of individual teeth. This is accomplished by cutting transverse or radial grooves 27 in each row to correspond to the number of teeth; for example, six teeth in row 17a, twelve teeth in row 17b, twenty teeth in row 17c and twenty-four teeth in each of rows 17d and 17e. Referring to FIGS. 2, 4 and 5, each radial groove comprises a bottom portion 27b and two straight sides 27s diverging from the bottom. A rounded portion 28 connects the straight sides of two adjacent radial grooves and forms the crest portion of the tooth. The sides 27s of the radial grooves 27, which form the flanks of the teeth 17c are similar to the sides 18s of the circumferential grooves, but the radial grooves are not as deep or as wide as the circumferential grooves 18. The center of curvature of the rounded bottom 27b lies below (closer to the cutter axis [21] *13* than) the centers of curvature of rounded surfaces 19 and 28. The radial grooves 27 may be formed by a milling machine or by using a shaper having a cutting tool arranged to reciprocate along the axis of the cone and with the cone arranged for indexing movement about its own axis.

Referring to FIG. 5, the individual tooth 17c comprises a root portion of pyramidal shape having two tapered side walls 18s lying between circumferential grooves 18, and having two end walls or flanks 27s lying between radial grooves 27. Above the root portion, the tooth has a crest portion, the exposed area of which is defined by the intersection of two approximately cylindrical surfaces 19 and 28. These two cylindrical surfaces intersect along approximately radial lines 29. If desired, the lines 29 may be smoothed out by filing or grinding so as to present substantially a continuous convex surface, of approximately hemispherical shape, on the crest portion of the tooth.

The teeth 17b are substantially of the same shape as the teeth 17c except for a slight difference in size and proportions. The teeth 17a are similar as to the rounded tip portions but are not provided with the pyramidal root portion due to space limitations. As seen in FIGS. 1 and 2, the tip portion of the cone cutter immediately in front of row 17a is provided with a dull blade 31 extending diametrically at the apex end of the cone. The blade is positioned to cut the center of the bore hole and thus perform the same function as the usual spear point but is so shaped as to avoid any sharp corners. Referring to FIGS. 1 and 2, the teeth 17d and 17e are in line with each other and form practically a single row of teeth as they are separated by a relatively narrow circumferential groove 32. Radial grooves 33 extend between the teeth 17d and part way through the outermost row 17e. Grooves 33 are similar to the radial grooves 27 but lose depth as they approach the heel of the cone cutter 16. The teeth 17e are spaced from the heel 34 of the cone cutter leaving a marginal area between the side wall of the bore hole and the area cut by the outermost row of teeth 17e. This area is cut by an offset shoulder 36 at the heel of the cone. The shoulder also constitutes an annular wall which terminates or closes the outer end of the radial grooves 33. The heel surface 34 rubs against the side wall [14] of the bore hole and maintains the gage of the hole, regardless of wear on the outer-most row of teeth 17e.

As shown in FIG. 1, the peripheral surface of the cone cutter 10 is carburized and heat treated to provide a case hardened skin 39. In accordance with this invention, such carburizing is carried to a further degree and to a further depth of case as compared with standard practice. With the usual form of cutter, having chisel shaped teeth, any attempt to increase the percentage or depth of carburization would cause excessive brittleness with the result of the teeth being chipped and broken off along the sharp cutting edges. This, of course, would impair the cutting properties of the drill bit and shorten its life. With the present invention, however, it is feasible to increase the degree and depth of case hardening beyond the normal safe limit and without any corresponding increase in the danger of chipping. This is made possible by the fact that the invention has eliminated sharp corners and instead substituted a form of tooth whose surface merges with other teeth in the same row to present an undulating formation of generally knuckle shape.

According to this invention, the cutter 10 is carburized by heating in a suitable atmosphere consisting, for example, of gaseous hydrocarbon or carbon monoxide and for such period of time until the carbon content of the steel is raised to about 0.85% at the surface and to about 0.80% at a depth of .04". Such a composition of the skin 39, being within the hyper-eutectoid range, represents a radical departure from the standard practice of carburizing a chisel-shaped tooth within the hypo-eutectoid range with the usual limit of 0.70% to 0.78% at the surface and with a considerably less percentage of carbon below the surface and, therefore, with less depth of hardened skin.

After the desired carbon concentration is obtained in the gas carburizing furnace, the cutter 10 is slowly cooled. Due to the relatively high concentration of carbon the cooling is accompanied by the formation of particles of cementite around the grain boundaries within the case 39. The cutter is then reheated at 1550° F. and oil quenched. This heat is sufficient to dissolve the cementite from the grain boundaries and disperse them in the form of spheroidized particles distributed throughout the hyper-eutectoid case, or interspersed in excessive austenite. Next, the cutter 10 is reheated to 1450° or 1460° F. and oil quenched. The austenite is thereby mostly transformed, resulting in a case 39 consisting of martensite, finely divided retained austenite and the dispersed cementite, in the form of spheroidized particles, as aforesaid. The cutter is then tempered at 350° F. After tempering, the cutter is deep frozen at (minus) −150° F. for a half hour and retempered at 375° F.

The hyper-eutectoid carbon in the case 39, with dispersed spheroid cementite particles, increases the hardness, wear resistance, and life of the cutters considerably. This result is necessarily accompanied by a reduction in the toughness of the case but such reduction may be tolerated without ill effects because the teeth of this invention are so shaped that they absorb impact loads without fracturing.

The completed cutter 10, which is manufactured according to this invention, operates in a novel manner. In such operation, the bit head (not shown) is revolved about its vertical axis [14] carrying with it the cutter 10 which rolls over the bottom of the bore hole about its individual axis 13 with an approximate true rolling motion. Due to the wide grooves 18 and the staggering of the teeth in one circumferential row (17c) out of radial alignment with the teeth in other rows (17a, b, d) there are only a few teeth in contact with the bottom of the hole at any one time. Assume that the earth formation is extremely hard and abrasive so that it could not be cut by the conventional chisel tooth. The drill is turned at a relatively slow rate, say thirty revolutions per minute under tremendous pressure which may run as high as 100,000 pounds in a bit of the 8¾" size. This weight is concentrated upon a few minute areas at the bottom of the bore hole represented by the points of tangency with the curved crests 19, 28 of teeth 17(a, b, c, d). The effect is to fracture the hard rock at the bottom of the bore hole with a crushing action, thus dislodging small particles of detritus which are carried to the surface of the hole by the action of the usual flushing fluid arrangement. The crushing pressure on the rock has its counterpart in a reactive force which tends to crush the teeth 17a, b, c, d, e but such pressure is resisted by the arch-like construction of the teeth, which gives them great compressive strength. At the same time, abrasion on the teeth is resisted by the relatively deep hardened case 39 thus prolonging the life of the cutters.

Assume now that the rock bit when only partly worn reaches the end of the layer of extremely hard and abrasive formation and strikes a relatively softer formation such as a stringer of shale. Unlike the prior art hard formation bit of the inserted plug type, the rock bit, which is provided with cutters made according to this invention, need not be pulled and replaced by a chisel toothed bit. Instead it is permitted to continue to run, preferably at a higher speed but lower pressure. The cutter teeth of this invention, notwithstanding their blunt tips 19, 28, will continue to drill without "balling up" because the root portion 18s provides sufficient length of tooth to permit them to penetrate deeply into the relatively soft earth formation.

From the foregoing description, it will be seen that the cutters which are made by the process of the present invention will drill effectively in relatively soft and medium formations heretofore considered suitable for drilling only by chisel teeth but not by teeth of the inserted plug type; and also in extremely hard formations heretofore considered as suitable for drilling only by bits having short inserted plugs and not by chisel toothed bits. In short, the invention obviates the necessity of changing from one type of bit to the other and back again. The invention is particularly applicable to extremely hard limes where shale stringers are interspersed between the hard rock strata. In cases such as this, the inserted carbide bit must be pulled out of the hole and a conventional chisel tooth bit run back in, and vice versa, with each bit, making only a few feet of hole. Where these formations are encountered the well is usually more than ten thousand feet deep and the time involved in changing a bit, or "making a round trip" is very considerable and adds greatly to the cost of drilling operations.

Even in uniform hard rock formations where there is no necessity for changing the bit before it is worn out, the invention has the advantage of economy in the cost of manufacture as its cost is only a fraction of that of the inserted carbide type of bit, although its performance compares favorably. Another advantage is that the teeth, being an integral part of the cone cutter cannot fall out as happens with teeth of the inserted plug type.

What is claimed is:

1. The method of making a roller cutter for an earth boring drill which comprises turning a steel cone blank about its axis while feeding a plurality of forming tools toward the blank to cut circumferential grooves therein separated by ridges having straight sides, feeding a second set of forming tools at a different angle toward the grooved work piece while turning the latter to round off one side of each of a plurality of ridges, feeding a third set of forming tools at a still different angle toward the grooved work piece to round off the other side of each of a plurality of ridges until the upper portion of each ridge is shaped into a half torus, then cutting radial grooves transverse to the ridges to divide them into individual rows of teeth, then rounding the flanks of the teeth adjacent the radial grooves to form an undulating surface extending circumferentially of the row of teeth.

2. The method of making a roller cutter according to claim 1, which further comprises the removal, by filing or abrasion, of the edges separating the rounded sides from the rounded flanks of the teeth.

3. The method of making a roller cutter for an earth boring drill according to claim 1, which further comprises case hardening the cutter by carburizing the toothed surface thereof to the extent of between eighty and ninety parts of carbon per thousand.

4. The method of making a roller cutter for an earth boring drill according to claim 1, which comprises the additional steps of carburizing the toothed surface of the cutter to case harden it within the hyper-eutectoid range, and heat treating the cutter to disperse the excess free cementite constituents into spheroid particles distributed throughout a predominantly martensitic case, thereby increasing the hardness and wear resistance of the cutter teeth.

*5. The method of making a roller cone for an earth boring drill which comprises: turning a steel cone blank about its axis while feeding a plurality of forming tools with straight cutting edges toward the blank to cut circumferential grooves therein separated by ridges, each ridge in longitudinal section having outwardly tapering straight sides and having a sharp corner at the outer edge of each side; supporting cutting tool means for straight line movement inwardly and outwardly relative to the axis of the cone blank, the cutting tool means having curved cutting edge means to engage said sharp corners upon such inward movement; and effecting relative rotation between the cone blank and the cutting tool means while forcing the latter inwardly against each ridge to mill the sharp corner of each ridge and change it to a rounded shape conforming in section with the curvature of the cutting tools means.*

*6. The method of making a roller cone for an earth boring drill according to claim 5, which includes the step of milling a radial groove in each of the ridges, indexing the cone blank, and repeating the milling and indexing steps to produce radial grooves evenly spaced about the circumference of each ridge, and thereby forming teeth between the circumferential and radial grooves, the sides of the radial grooves having such a curvature that each tooth has the same convex shape in longitudinal section as in cross section.*

*7. The method of making a roller cone for an earth boring drill according to claim 6, which further comprises case hardening the cone by carburizing the toothed surface thereof to the extent of between eighty and ninety parts of carbon per thousand.*

No references cited.

GRANVILLE Y. CUSTER, JR., *Primary Examiner.*